Dec. 21, 1965  H. P. FRY, JR  3,224,922
APPARATUS FOR MAKING WEFTLESS TAPE
Filed Sept. 23, 1960  3 Sheets-Sheet 1
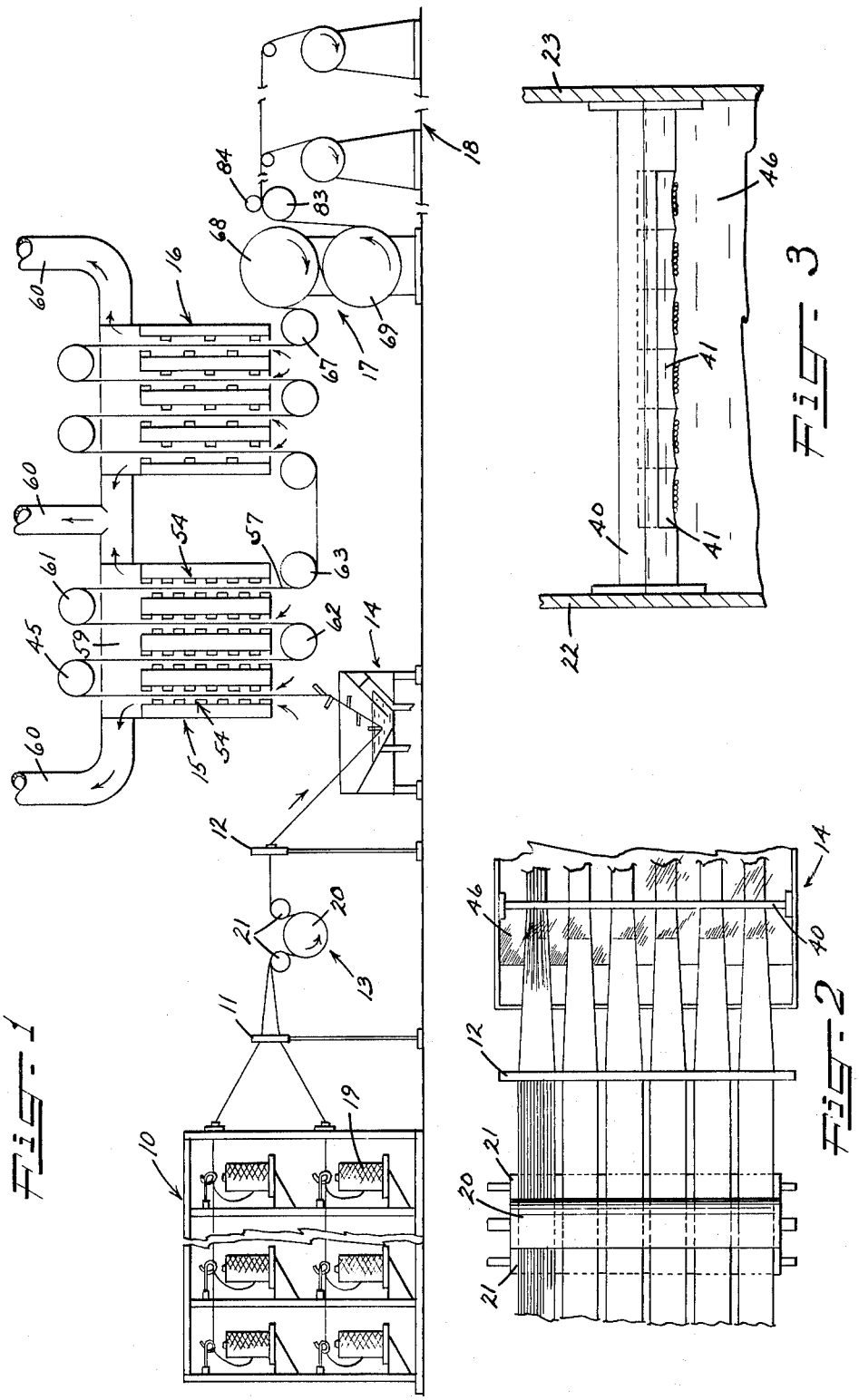

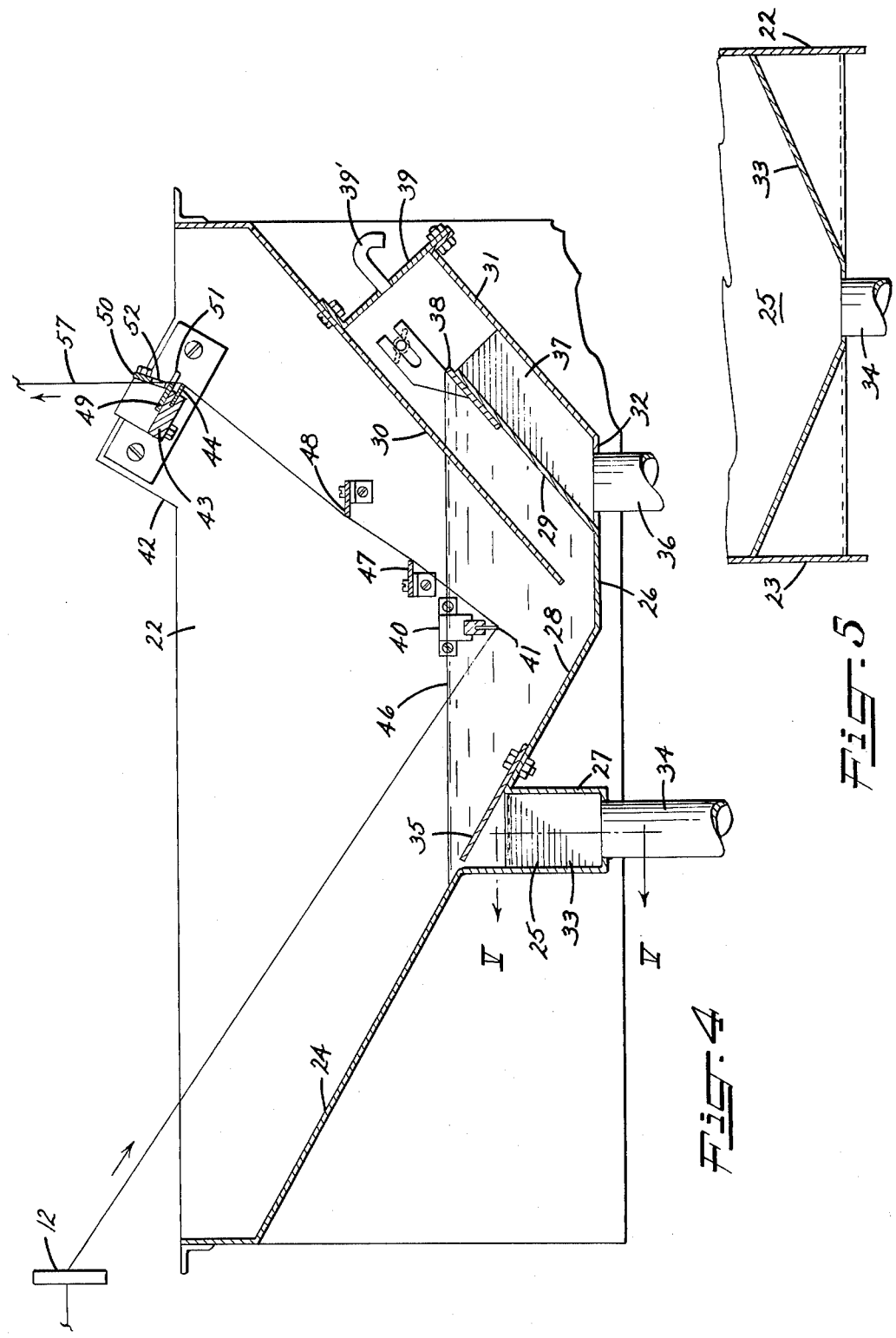

Dec. 21, 1965    H. P. FRY, JR    3,224,922
APPARATUS FOR MAKING WEFTLESS TAPE
Filed Sept. 23, 1960    3 Sheets-Sheet 3

United States Patent Office 3,224,922
Patented Dec. 21, 1965

3,224,922
APPARATUS FOR MAKING WEFTLESS TAPE
Horace P. Fry, Jr., West Chester, Pa., assignor, by mesne assignments, to FMC Corporation, San Jose, Calif., a corporation of Delaware
Filed Sept. 23, 1960, Ser. No. 58,121
1 Claim. (Cl. 156—433)

This invention relates to the art of making weftless tape and more particularly to an improved method of making a high-strength weftless tape and an apparatus for making such tape at a high rate of production.

While weftless tapes of relatively low strength, such as florist ribbons, have been known for many years, there has more recently been developed a high-strength tape formed of a plurality of side-by-side relatively heavy cords of the type used in vehicle tires. These latter tapes have become known as cord tapes or cord strapping and are used for banding boxes, bales and other objects in the manner of the more generally familiar steel band strapping. While certain features of the present invention are useful in the manufacture of light duty tapes and ribbons, it is in connection with cord tapes that the invention as a whole achieves its greatest utility and it is in connection with such tapes that it will be described in detail.

It is an object of this invention to provide an apparatus which facilitates the manufacture of cord tapes of uniform high quality at a high rate of production and consequent relatively low cost.

A further object of the invention is to provide a method of making cord tape which results in superior binding together of the individual cords thereof.

Other and further objects, features and advantages of the invention will become apparent as the description of a preferred embodiment thereof proceeds.

Referring now to the drawings:

FIGURE 1 is a more or less diagrammatic side elevational view of the overall apparatus;

FIGURE 2 is a plan view showing a multiplicity of cords passing through a tension equalizing station and being brought together into a plurality of groups so as to subsequently form a plurality of tapes;

FIGURE 3 is a sectional view through a portion of a tank containing an adhesive composition and showing a compacting guide arrangement employed to move the cords of the individual groups into contacting relationship;

FIGURE 4 is a sectional view of the adhesive applying tank showing the means for regulating the liquid level and the tape guides;

FIGURE 5 is a section taken on the line V—V of FIGURE 4;

Figure 6:
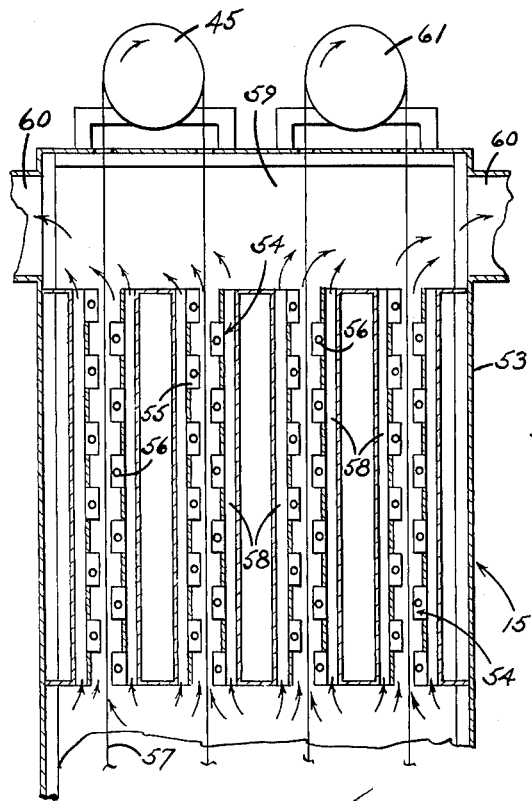
FIGURE 6 is an enlarged side elevational view of a drying chamber used for drying the tapes after the adhesive composition has been applied.

Referring first to FIGURE 1, the apparatus comprises a creel generally indicated at 10 from which a multiplicity of cords are led through a pair of spaced guide means 11 and 12 which serve to arrange the cords in parallel relationship and between which is located a set of tension equalizing rollers generally indicated at 13. From the guide means 12 the strands pass through a tank 14 containing an adhesive composition subsequent to the application of which individual groups of cords are compacted together side-by-side to form a plurality of tapes. From the adhesive tank 14 the tapes are led in a tortuous path through a drying chamber generally indicated at 15 where heat is applied to the tapes to remove the water picked up in the adhesive bath and after leaving the drying chamber 15 the tapes are led through a fusing chamber 16 wherein they are additionally heated so as to fuse the resinous particles whereby a continuous coating is formed on the tapes. It should be mentioned at this time that the adhesive composition is preferably an aqueous dispersion of non-water soluble fusible synthetic resinous material in particulate form, as will later be more fully identified. Upon leaving the fusing chamber, the tapes pass around a pair of large cooling drums generally indicated at 17 which are power driven and which serve not only to cool the tapes but to pull them through the apparatus. After leaving the drums 17 the tapes pass to a winding station generally indicated at 18 where they are wound into individual packages.

The creel 10 may support a fairly large number of packages 19 and in operation the resistance to withdrawal of the cords from the creel will vary somewhat from package to package. Thus those cords coming from packages located furthest away from the guide 11 will generally offer more resistance than those located closer to said guide, since the former travel a longer path and pass through more guides within the creel. Also one or more cords may become snagged on the creel guides from time to time so as to momentarily offer increased resistance or a defectively formed package may make the cord harder or easier to withdraw. To obtain uniform application of adhesive to the individual cords and to form tapes wherein all of the cords are under equal stress, it is important that the cords be under substantially equal tension when they enter the adhesive bath and to this end the roller system 13 is provided. This system comprises a large roller 20 and two smaller rollers 21. The rollers 20 and 21 are freely rotatable and are driven by the cords which pass therearound. Thus the rollers are driven by practically all the cords and at the average cord speed. The ones with greater tension contact the rolls with greater pressure, hence greater friction, and are thus advanced to a speed approximately equal to the roll surface speed. In other words, the cords of above average tension are being worked on by the rollers. The cords of lower tension slide over the rollers until the friction is sufficiently high to impart rotation to the rollers. The added drag decreases their speed until it is approximately equal to the roll surface speed. Rollers 21 are positioned out of contact with roller 20 so that slippage of the cords is possible. Furthermore, this spacing apart of rollers 20 and 21 lessens the chance for a broken cord to become wrapped about roller 20 as would happen if rollers 21 actually formed a nip with roller 20. The rollers are mounted in frictionless bearings so that turning effort is kept to a minimum.

As previously mentioned, the adhesive composition is preferably a dispersion of a non-water soluble, fusible, synthetic resinous material in an aqueous medium, more specifically in water. Examples of resinous materials which are useful for this invention include vinyl resins, acrylic resins, vinylidene halide resins, polyamide resins, but because of its relatively low cost and excellent film-forming properties the preferred resin is polyvinyl acetate. Generally, the average particle size should not exceed 10 microns and preferably will be less than 1 micron. It is also desirable to incorporate a plasticizing agent in the adhesive composition and for this purpose acetyl tributyl citrate has been found to be eminently satisfactory.

Since the adhesive composition is a dispersion rather than a true solution, the proportion of ingredients is apt to change as the cords pass therethrough, that is, the cords will pick up more of one ingredient than another. More particularly, if the composition is merely contained in an ordinary tank or trough, the water component will be removed faster than the resin so that continuous adjustment is desirable. There are other problems in connection with the use of a resin dispersion, as will presently appear, which make it desirable to provide a tank of special construction for containing the adhesive composition. Accordingly, tank 14 is especially designed as a component of the present machine and its construction will now be described.

Referring to FIGURES 3, 4 and 5, the side walls of tank 14 are formed of vertically extending, spaced apart rectangular plates 22 and 23. A generally S-shaped member extends between the side walls and is welded or otherwise sealed thereto so as to provide a sloping tank wall 24 and a vertically downward extension 25. A plate 26 is also secured between side walls 22 and 23 and said plate has a portion 27 parallel to downward extension 25 and a sloping portion 28 aligned with sloping tank wall 24 and constituting an extension of the tank wall. Plate 26 also has an upwardly sloping end portion 29. A plate 30 extends between the side walls of the tank parallel to and spaced from the upwardly sloping end 29 of plate 26 and another plate 31 extends between the side walls parallel to and spaced from end 29, said plate 31 having a horizontal lower end portion 32 which is joined with plate 26 at the point where the latter begins its upward slope. As best shown in FIGURE 5, a plate 33 fits tightly between the side walls 22 and 23 and the downwardly extending portions 25 and 27 and said plate has sloping end portions leading upwardly from a horizontal bottom portion. An inlet pipe 34 is connected to the horizontal bottom portion of plate 33 and continuously supplies adhesive to the tank. As the adhesive composition enters the tank it spreads from the pipe along the sloping ends of plate 33 so as to enter the tank proper across the entire width thereof between side walls 22 and 23. To further aid in the distribution of the composition across the tank, a plate 35 is mounted so as to block off all except a small portion of the space between the surfaces 24 and 28 so that a slight pressure may be built up between the end of the pipe and plate 35.

The adhesives composition is introduced at a considerably faster rate than it is taken up by the cords passing through the bath and the excess passes under the lower end of plate 30 and over the upper end of the sloping portion 29 of member 26 and is discharged through a pipe 36 connected to the horizontal lower end 32 of plate 31. The pipe 36 is located on the center line of the tank between side plates 22 and 23 and a member 37, similar to plate 33, slopes upwardly from the pipe to the opposite side plates so as to funnel the liquid to the pipe after it passes over the plate 29. The material discharged through pipe 36 is recirculated through the system and the composition may be readjusted to the desired constituency before re-entering the tank.

In order to permit adjustment of the liquid level within the tank, a plate 38 is adjustably slidably mounted between side walls 22 and 23 and slides with a tight fit against the sloping upper end 29 of member 26. Since the liquid must flow over plate 38 to get out of the tank, the position of said plate determines the level of the liquid within the tank.

The nature of the preferred adhesive composition is such that if not constantly agitated a skin will form on the surface if it is exposed to the atmosphere. When the machine is in operation, the constant flow of liquid through the tank together with the action of the cords passing through the bath are sufficient to prevent a skin from forming and when the machine is shut down the skin formed on the surface between tank walls 24 and 30 may be easily removed since that portion of the liquid is readily accessible. To prevent formation of skin between the plates 29 and 30 which would be difficult to remove and which could interfere with the proper discharge of adhesive composition from the tank, a cover 39 is provided between plates 30 and 31 so that the surface of the composition is not exposed to the atmosphere. A small breather tube 39' is provided to prevent a vacuum from forming beneath cover 38 which would set up a siphoning action and empty the tank.

Extending across tank 14 and secured to the side walls 22 and 23 is a compacting guide supporting member 40 in which are individually mounted a plurality of curved compacting guides 41. The curved portions of guides 41 face the bottom of the tank and there is a separate guide for each tape to be made on the machine. After leaving guide 12 the cords pass beneath compacting guides 41 which serve to segregate the cords into a plurality of groups and to urge the individual cords of each group toward one another.

Secured to the upper edges of the tank side walls 22 and 23 are a pair of plates or brackets 42, only one of which is shown, and secured to said brackets and extending across the tank is a bar 43 mounted upon which is a second set of curved compacting guides 44. After leaving the compacting guides 41 the cords, now grouped into tapes, pass to the compacting guides 44 from which the tapes move upwardly to the first of a series of freely rotatable drums 45. When the tapes are pulled through the apparatus by the drum 17 it is the tension developed between compacting guides 41 and 44 which causes the cords of each tape to move into tight side-by-side arrangement.

The adhesive composition is indicated at 46 and from FIGURE 4 is will be observed that the compacting guides 41 are located a relatively short distance beneath the surface of the adhesive composition and that the total travel of the cords through the bath is relatively short. This arrangement prevents the cords from picking up an overly excessive amount of adhesive and also prevents the cords from picking up an excessive amount of water. As shown in FIGURE 2, the cords are not in actual contact with one another at the time they enter the adhesive bath and therefore each cord is thoroughly coated with the adhesive before being moved into contact with its neighbor as they pass around the first compacting guides 41.

While it is not desirable to run the cords through the bath for such a distance that an overly excessive amount of adhesive is picked up or that the cords adsorb a great amount of water, it has been found that the amount of adhesive on the finished tapes can most accurately be controlled by allowing the cords to pick up more adhesive than desired on the finished tapes and then scraping off the excess. Thus a pair of scrapers 47 and 48 are mounted in tank 14 for removing excess adhesive from the opposite sides of the tape. These scrapers are mounted so that they do not appreciably deflect the path of the tapes as they pass between condenser guides 41 and 44. If these scrapers press too hard against the tapes, the lower scraper 47 will press the adhesive right through the tapes and then scraper 48 will press it back to the other side thus leaving an overly heavy coating on one side (the top as viewed in FIGURE 4). If desired, scrapers 47 and 48 may be adjustably mounted so as to permit varying amounts of coating to be left on the tapes.

Located directly above condenser guides 44 are a pair of plates 49 and 50 which are provided with notches 51 and 52 respectively. Notches 51 and 52 are substantially the exact width of the tapes passing therethrough so as to scrape practically all adhesive from the edges of the tapes and so as to further press the cords of each tape into tight side-by-side relationship. The bottoms of the notches also provide additional scraping surfaces for removing excess adhesive from the sides of the tapes.

If the adhesive composition is of the nature above described, it is the resinous constituent which serves to bind the cords together and for most effective binding it is desirable that the resinous particles be fused to one another and to the cords. The fusing is accomplished in the usual manner, that is by the application of heat, but before this is done it is necessary to remove from the tapes the water picked up in the bath and to this end the tapes are passed through the drying chamber 15 after the cords have been firmly pressed together and excess adhesive composition wiped off.

Figure 7:
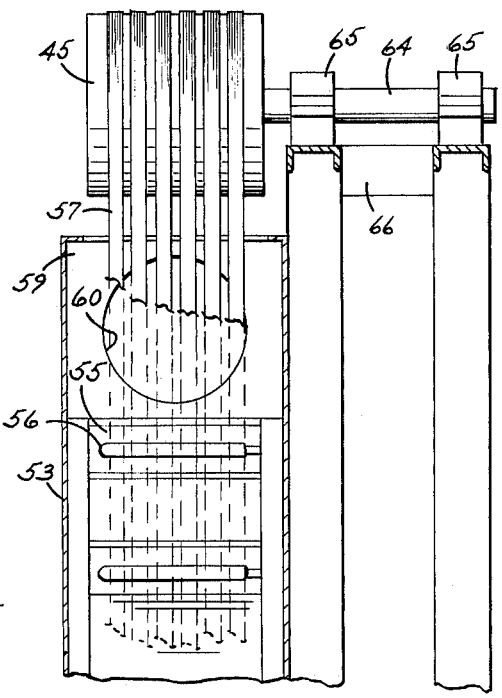
FIGURE 7 is an enlarged fragmentary view of the upper portion of the drying chamber and showing a plurality of tapes passing through the apparatus.

Dryer 15 comprises a housing 53 within which are mounted a plurality of sets of vertically spaced heating elements 54. The heating elements may be in the form of commercially available radiant quartz heaters and as indicated in FIGURES 6 and 7 each heater includes a reflector 55 and a heating tube 56. Since the tapes are actually formed, if not completely finished, when the cords leave the edge scrapers 49 and 50, they are indicated as such at 57 and it will be observed that the heating elements are located on both sides of the paths taken by the tapes as they pass through the dryer. Tubes 56 will cool down almost immediately when the power is shut off but the reflectors 55 will continue to direct heat onto the tapes, therefore the heaters on one side of the tapes are offset from the heaters on the opposite side so that when the machine is stopped the tapes in the dryer will not be subjected to so much heat in concentrated areas as to set them on fire.

Ducts 58 are provided along the back sides of the heating elements 54 and these ducts, as well as the passageways between the heaters through which the tapes pass are open to the room at the bottom and at the top are connected with a chamber 59 from which air is continuously withdrawn through tubes 60. This arrangement prevents overheating of the reflectors, helps considerably in cooling them when the power is shut off and removes the moisture given up by the tapes.

For directing the tapes through the drying chamber in a tortuous path, sets of upper and lower drums are provided. The upper set consists of the drum 45 previously referred to and a second drum 61 and the lower set is formed of drums 62 and 63 (see FIGURE 1). The drums are of equal diameter and those of the lower set are offset horizontally a radial distance from those of the upper set so as to provide a plurality of vertical runs for the tapes as they pass about said drums. As shown for the drum 45 in FIGURE 7, each drum is mounted cantilever style on a hollow shaft 64 supported in bearings 65 on the framework 66. The drums are freely rotatable and are supplied with a temperature regulating liquid which may be introduced in any convenient manner such as presently to be described in connection with the drum shown in FIGURE 8.

For most economical, effective and uniform drying it is desirable to raise the temperature of the tapes rapidly at the beginning of each of their vertical runs through the dryer and then for the remainder of the run to merely maintain that elevated temperature. Therefore the six heaters 54 located first above scrapers 49 and 50 are maintained at a higher temperature than the upper six heaters of that group and likewise in the other groups of heaters those first passed by the tapes are maintained at a higher temperature than those located further along the particular vertical run of the tapes. This difference in temperature of the heaters is obtained by supplying a higher voltage to the tubes of the hotter heaters.

When a polyvinyl acetate dispersion is employed as the adhesive, some of it will be removed from the tapes and adhere to the guide drums if the temperature of the drums is too high. Since the tapes themselves are hot when they contact the drums, it is desirable that the temperature regulating liquid be a cooling liquid to prevent the drums from becoming overheated due to heat transfer from the tapes. Experience has shown that a drum surface temperature of approximately 90° F. is satisfactory. This is low enough to prevent the resin from fusing to the drums and high enough to prevent sweating.

When the tapes leave the drying chamber 15 substantially all the water picked up in the adhesive bath has been removed and the tapes are covered with minute particles of the resin. Some of the resin particles adhere to one another and to the tapes but this adhesion is rather weak and without a further operation the tapes would have a very low transverse strength, that is the individual cords could be readily separated. In order to produce tapes having a high transverse strength, the tapes are led through the fusing chamber 16 wherein sufficient heat is applied to cause a complete fusing of the resinous particles to one another and to the tapes so as to form a continuous, very thin film. Fusing chamber 16 is similar to drying chamber 15 and need not be described in detail. As shown in FIGURE 1, the fusing chamber contains rows of radiant heating element similar to the heating elements 54 and the tapes are guided therethrough by means of upper and lower sets of freely rotatable drums, the last of which is indicated at 67. The guide drums for the fusing chamber are cooled in the same manner and to the same degree as those of the drying chamber and the heating elements are operated in the same manner as those of the drying chamber, that is the heating elements first passed by the tapes after they leave a drum are hotter than those passed during the remainder of the run to the next drum. Since the water has already been removed from the tapes, it is not necessary to provide as many heating elements in the fusing chamber as in the drying chamber.

Figure 9:
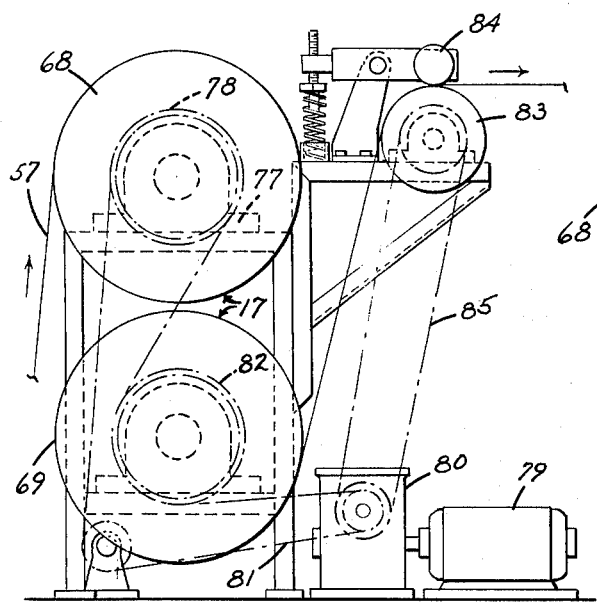
FIGURE 9 is a diagrammatic view of the driving mechanism of the machine.
Figure 8:
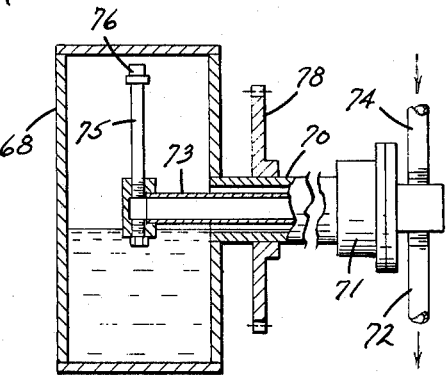
FIGURE 8 is a sectional view of one of a pair of cooling drums used to pull the cords from the creel and the tapes through subsequent portions of the apparatus.

From drum 67 the tapes pass about the large cooling and driving drums generally indicated at 17 and constituting a pair of hollow drums 68 and 69, best shown in FIGURES 8 and 9. Drums 68 and 69 are similar in mounting and construction and as shown in FIGURE 8, drum 68 is secured to one end of a hollow shaft 70 the other end of which is connected through a suitable seal 71 to a discharge pipe 72. A hollow shaft 73 is concentrically mounted within shaft 70 and connected at one end to an inlet pipe 74 which supplies cool water. The end of shaft 73 within the drum is connected to a vertically extending tube or pipe 75 provided with a nozzle 76 which sprays the cooling water against the inner cylindrical surface of the drum. The water is of course discharged from the drum through the passage between shafts 70 and 73. Shaft 70 is rotatably mounted in a bearing 77 and has keyed thereto a sprocket wheel 78.

An electric motor 79 drives a speed control unit 80 which is drivingly connected through a chain 81 to the sprocket 78 and to a sprocket 82 associated with the drum 69. Thus both drums 68 and 69 are positively driven and serve to pull the cords from the creel and the tapes through the following portions of the machine.

In order to prevent the tapes from slipping about drive drums 68 and 69, they are drawn tight about said drums by passing between a driven drum 83 and a spring pressed roller 84. Drum 83 is driven from the speed control unit 80 through a chain 85 at a slightly higher peripheral speed than drums 68 and 69 so that the tapes are under tension between drums 69 and 83. Preferably, drum 83 is driven through a slip clutch so that there will be no slipping of the tapes against the surface of said drum but at the same time tension will be maintained on the tapes.

From drum 83, the tapes pass to the winding station 18 where they are individually wound into packages. Since packages are completed and new ones started from time to time, drum 83 and associated roller 84 serve to maintain the tension on the tapes during package changes.

Since the apparatus as described is especially adapted for making tapes wherein the binding agent is an aqueous resin dispersion, it will be apparent that it may be modified to some extent when other types of binding agents are used. Thus, the tank 14 may be considerably simplified when an adhesive is used which will not harden when exposed to ordinary room atmosphere. Also with certain adhesives no fusing is required and when such adhesives are used the fusing chamber 16 may be eliminated. Other modifications within the scope of the present invention will suggest themselves to those skilled in the art and it is therefore the intention that the scope of the invention is to be limited only by the terms of the accompanying claim.

Having thus described the invention, what is claimed is:

Apparatus for making weftless tape comprising means for applying an adhesive composition to a plurality of juxtaposed strands to adhere the strands together in the form of a tape, means for directing the tape through a tortuous path having a plurality of vertical runs, said means comprising a plurality of upper and lower freely rotatable drums with the lower drums having axes spaced horizontally with respect to the upper drums whereby the tape may be directed first about an upper drum and then alternately about a lower drum and an upper drum, means for applying a relatively large amount of heat to the tape shortly after it leaves a drum and then a lesser amount of heat during the remainder of the run to the next drum, means for controlling the temperature of the drums to prevent overheating thereof due to heat transfer from the tape to the drum, and means for cooling the tape after its passage through the aforesaid tortuous path about said drums, said last-named means comprising a pair of relatively large driven drums which also serve to pull the tape through the aforesaid tortuous path.

References Cited by the Examiner
UNITED STATES PATENTS

| | | | |
|---|---|---|---|
| 1,619,191 | 3/1927 | Castricum | 154—1.75 |
| 2,308,239 | 1/1943 | Bell | 34—4 XR |
| 2,497,045 | 2/1950 | Killingsworth et al. | |
| 2,792,325 | 5/1957 | Downing et al. | 154—92 |
| 2,954,815 | 10/1960 | Kuts | 154—1.7 |

FOREIGN PATENTS

| | | |
|---|---|---|
| 162 | 1913 | Great Britain. |
| 809,026 | 2/1959 | Great Britain. |
| 611,929 | 7/1929 | France. |

OTHER REFERENCES

Water Emulsions of Polyvinyl Acetate, Du Pont Publication by the R & H Chemical Dept., November 13, 1943.

EARL M. BERGERT, *Primary Examiner*.

CARL F. KRAFFT, *Examiner*.